United States Patent
Wu et al.

(10) Patent No.: US 10,075,099 B2
(45) Date of Patent: Sep. 11, 2018

(54) POWER GENERATION APPARATUS AND TOUCH APPARATUS WITH GRAIN MATERIALS

(71) Applicant: NATIONAL TSING HUA UNIVERSITY, Hsinchu (TW)

(72) Inventors: Jyh-Ming Wu, Hsinchu (TW); Chih-Kai Chang, Hsinchu (TW); Yu-Ting Chang, Hsinchu (TW)

(73) Assignee: NATIONAL TSING HUA UNIVERSITY, Hsinchu (TW)

(*) Notice: Subject to any disclaimer, the term of this patent is extended or adjusted under 35 U.S.C. 154(b) by 398 days.

(21) Appl. No.: 15/008,673

(22) Filed: Jan. 28, 2016

(65) Prior Publication Data
US 2017/0063256 A1   Mar. 2, 2017

(30) Foreign Application Priority Data
Sep. 1, 2015  (TW) .............................. 104128770 A

(51) Int. Cl.
*H02N 1/04* (2006.01)
(52) U.S. Cl.
CPC ..................... *H02N 1/04* (2013.01)
(58) Field of Classification Search
CPC .................. H01N 1/04; H02N 3/00
USPC .......................................... 310/310; 290/1 R
See application file for complete search history.

(56) References Cited

U.S. PATENT DOCUMENTS

| 6,995,496 | B1 * | 2/2006 | Hagood, IV | H02N 2/181 310/316.01 |
| 8,456,063 | B2 * | 6/2013 | Jager | H01L 41/1138 310/339 |

\* cited by examiner

*Primary Examiner* — Forrest M Phillips
(74) *Attorney, Agent, or Firm* — Amin, Turocy & Watson LLP

(57) ABSTRACT

A power generation apparatus and a touch apparatus with grain materials are provided. The power generation apparatus includes a grain material layer, a first electrode, an electric material layer, a second electrode and a conductive wire. The first electrode is electrically connected to the grain material layer. The electric material layer corresponds to the grain material layer, and a gap is formed between the grain material layer and the electric material layer. The second electrode is electrically connected to the electric material layer. The conductive wire is electrically connected to the first electrode and the second electrode. The grain material layer and the electric material layer interact with each other to generate a current or a voltage. Thereby, the present invention can generate power by utilizing a grain material.

18 Claims, 15 Drawing Sheets

POWER GENERATION APPARATUS AND TOUCH APPARATUS WITH GRAIN MATERIALS

BACKGROUND OF THE INVENTION

1. Field of the Invention

The present invention relates to power generation apparatuses and touch apparatuses, and, more particularly, to a power generation apparatus and a touch apparatus with a grain material.

2. Description of Related Art

In the modern micro-generators, crystalline material of a piezoelectric crystal is generally used as the electrically material between two electrodes in order to generate electricity by producing charges as a result of pressure. However, piezoelectric crystals are not flexible, and the production cost of crystalline materials is usually high, which leads to high prices of the micro-generators. Therefore, micro-generators are not applied extensively and cannot be manufactured into flexible products.

A grain material (such as rice husk) has a hard surface, a high silicon content, and a low bulk density, and is decomposable by bacteria. A grain material, when fired, generates carbon dioxide, which pollutes the environment. The waste of the grain material will damage the environment. Furthermore, the incineration of the grain material (such as rice husk) will also generate carbon emissions, which cause global warming.

Therefore, a solution that addresses the aforementioned issues of the conventional micro-generators as well as solving environmental damage is in need.

SUMMARY OF THE INVENTION

In view of the aforementioned shortcomings of the prior art, the present invention provides a power generation apparatus and a touch apparatus with a grain material for generating a current or a voltage using the grain material.

The power generation apparatus according to the present invention includes: at least one grain material layer; a first electrode electrically connected to the grain material layer; an electric material layer corresponding in position to the grain material layer and spaced from the grain material layer by a gap; a second electrode electrically connected to the electric material layer; and a conductive wire electrically connected to the first electrode and the second electrode, wherein the grain material layer and the electric material layer interact with each other to generate a current or a voltage.

In an embodiment, the grain material layer can be formed by a material selected from at least one grain material, and the grain material is rice husk, peanuts, sorghum, barley, wheat, oats, rye, or buckwheat.

In an embodiment, the grain material layer may have a porous structure, and the porous structure of the grain material layer interacts with the electric material layer to generate the current or the voltage.

In an embodiment, the grain material layer may be composed of a husk, an inner membrane or an outer membrane of the grain material; the grain material layer may be composed of at least one husk of the grain material; and the grain material layer may be composed of a plurality of husks of the grain material, and the husks are arranged in an array.

In an embodiment, the grain material layer may be composed of porous silicon dioxide powder of the grain material. The grain material may have a positively charged surface and includes silicon dioxide and lignin, and the porous silicon dioxide powder may have a positively charged surface higher than the positively charged surface of the grain material and does not include the lignin of the grain material.

In an embodiment, the power generation apparatus may further include a substrate having a first surface and a second surface opposite to the first face, wherein the grain material layer and the first electrode are formed on the first surface and the second surface of the substrate, respectively, and the second electrode is formed on an outer surface of the electric material layer.

In an embodiment, the at least one grain material layer is a first grain material layer and a second grain material layer, the first grain material layer is formed on the first surface of the substrate, and the second grain material layer is between the electric material layer and the first grain material layer.

In an embodiment, the power generation apparatus further comprises a third electrode, another electric material layer, and another conductive wire, the third electrode is formed between the second grain material and the another electric material, the conductive wire and the another conductive wire are electrically connected to the third electrode through the first electrode and the second electrode, respectively, and the first grain material layer and the second grain material layer interact with the another electric material layer and the electric material layer, respectively, to generate the current or the voltage.

In an embodiment, the first grain material layer is in contact with the another electric material layer, and the first grain material layer and the another electric material layer may be maintained in a non-fixed state.

In an embodiment, the another electric material layer is separated from the first grain material layer by a first gap, and the second grain material layer is separated from the electric material layer by a second gap.

The touch apparatus with a grain material according to the present invention allows a touch object to perform touch control. The touch apparatus may include: at least one grain material layer; and at least one first electrode electrically connected with the grain material layer, wherein the touch object performs touch control on the grain material layer to interact with the grain material layer to generate a current or a voltage.

In an embodiment, the grain material layer may be composed of a single husk or a plurality of husks of the grain material. The positively charged surface of the grain material may be lower than that of the touch object. Alternatively, the grain material layer may be composed of porous silicon dioxide powder of the grain material.

In an embodiment, the touch apparatus may include a substrate having a first surface and a second surface opposite to the first face, and the grain material layer and the electrode are formed on the first surface and the second surface of the substrate, respectively.

In an embodiment, the touch apparatus may further include a ground terminal electrically connected with the electrode, and the touch object and the grain material layer interact with each other to generate the current or the voltage via the electrode and the ground terminal.

From the above, it is clear that the present invention produces a charge, a current or a voltage (and in turn electrical energy) by allowing the interaction between the grain material layer and the electric material layer (or touch object). Compared with the conventional micro-generators, the present invention achieves flexibility and low costs, and overcomes environmental issues associated with the grain materials as agricultural waste.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

The present invention is described by the following specific embodiments. Those with ordinary skills in the arts can readily understand other advantages and functions of the present invention after reading the disclosure of this specification. The present disclosure may also be practiced or applied with other different implementations. Based on different contexts and applications, the various details in this specification can be modified and changed without departing from the spirit of the present disclosure.

Figure 1:
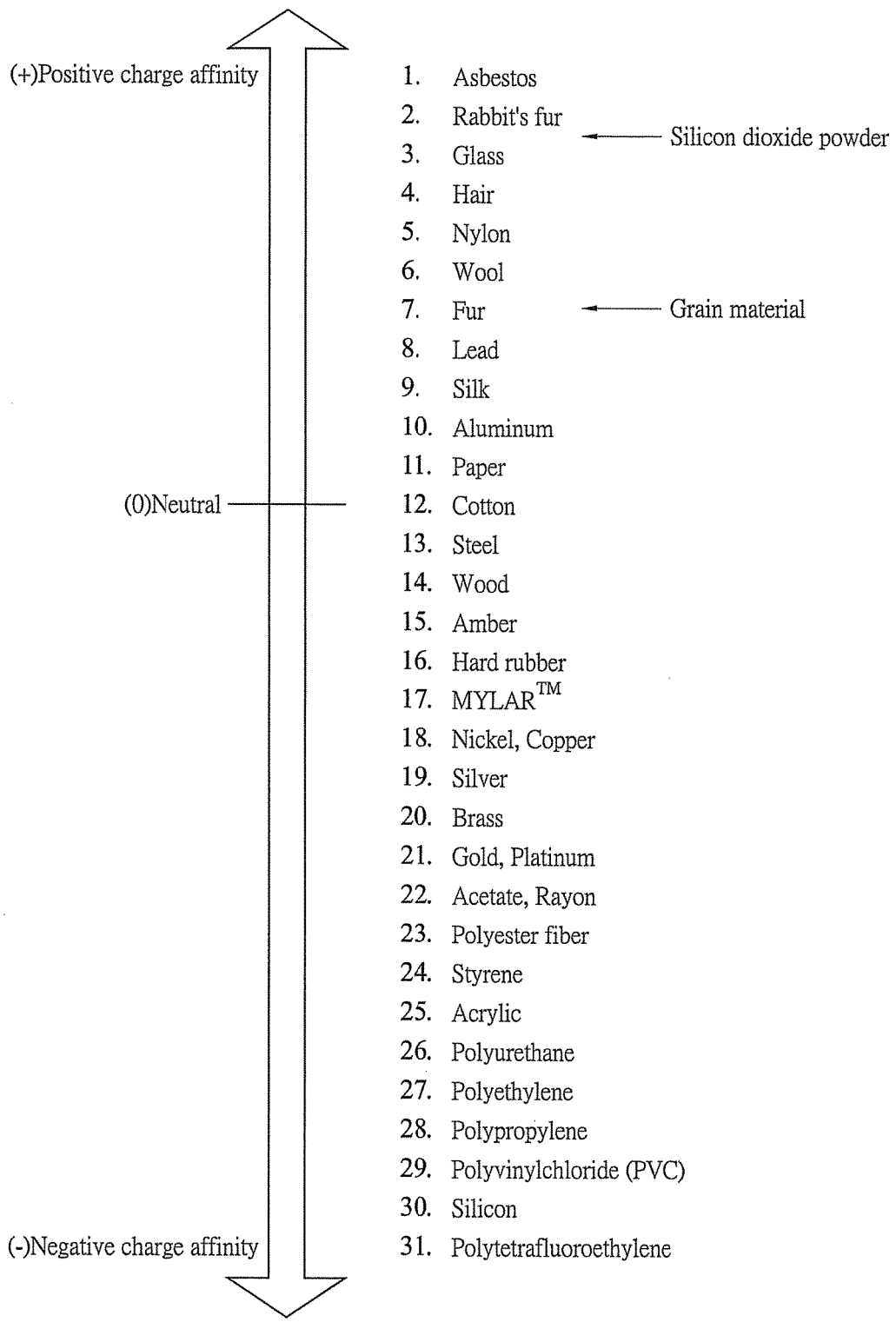
FIG. 1 is a schematic diagram illustrating electron affinities of a grain material according to the present invention, silicon dioxide powder and various materials.

Referring to FIG. 1, a schematic diagram illustrating electron affinities of a grain material according to the present invention, silicon dioxide powder and various materials is shown.

As shown, the electron affinity of the grain material (e.g., rice husk) according to the present invention is about the same as that of fur. The grain material may have a (+) positive charge and contain silicon dioxide (SiO$_2$) and lignin. Once the lignin is removed from the grain material to form the silicon dioxide powder (such as porous silicon dioxide powder), the silicon dioxide powder may have an even higher (+) positively charged affinity. The electron affinity of silicon dioxide powder is roughly between those of rabbit's fur and glass. However, the present invention is not so limited.

Figure 2:
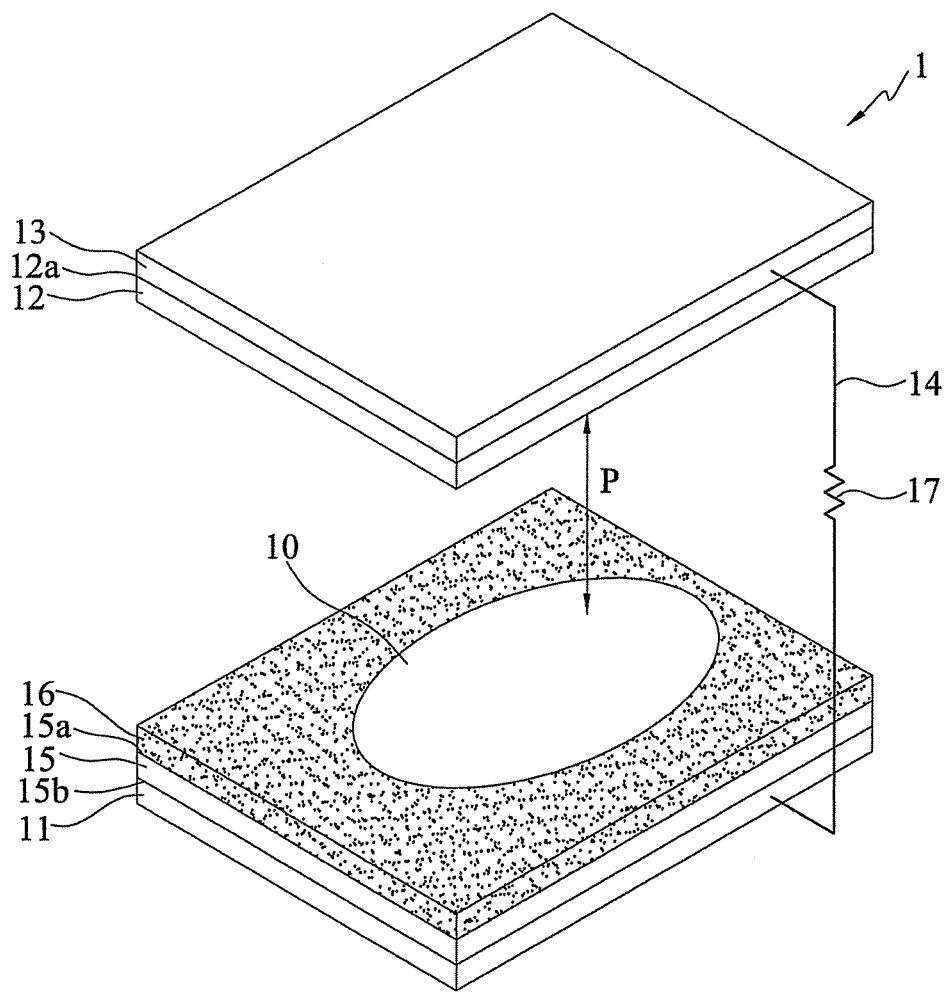
FIG. 2 is a perspective view of a first embodiment of a power generating apparatus according to the present invention.

Referring to FIG. 2, a perspective view of a first embodiment of a power generating apparatus 1 according to the present invention is shown. The power generating apparatus 1 includes at least one grain material layer 10, a first electrode 11, an electric material layer 12, a second electrode 13 and a conductive wire 14.

The first electrode 11 is electrically connected with the grain material layer 10. The electric material layer 12 corresponds in position to the grain material layer 10, and the grain material layer 10 and the electric material layer 12 are spaced by a gap P. The second electrode 13 is electrically connected with the electric material layer 12. The conductive wire 14 is electrically connected with the first electrode 11 and the second electrode 13. The grain material layer 10 interacts with the electric material layer 12 to generate a current or a voltage.

In FIG. 2 and FIG. 1, the grain material layer 10 may be formed by a material selected from at least one grain materials, such as rice (or rice husk), peanuts, sorghum, barley, wheat, oats, rye, buckwheat or the like. In an embodiment, rice or rice husk is used as an example of the grain material layer 10 or the grain material. The electric material layer 12 may be formed by a material selected from at least one metal material, semiconductor material, plastic material, animal's skin and fur. The metal material may be gold, silver, copper or the like. The semiconductor material may be silicon or the like. The plastic material may be polytetrafluoroethylene (PTFE), polyvinylchloride (PVC), polyethylene or the like. The animal's skin or fur may be a rabbit's fur, wool, human hair or the like. The first electrode 11 or the second electrode 13 may be made of, for example, copper. However, the present invention is not so limited.

The grain material layer 10 may have a porous structure, which interacts with the electric material layer 12 to generate the current or the voltage. In an embodiment, the grain material layer may be composed of the husk, the inner membrane or the outer membrane of the grain material, such as the rice husk, the peanut shell, the peanut film and the like, or the husk of sorghum, barley, wheat, oats, rye, buckwheat etc. However, the present invention is not so limited.

Figure 4:
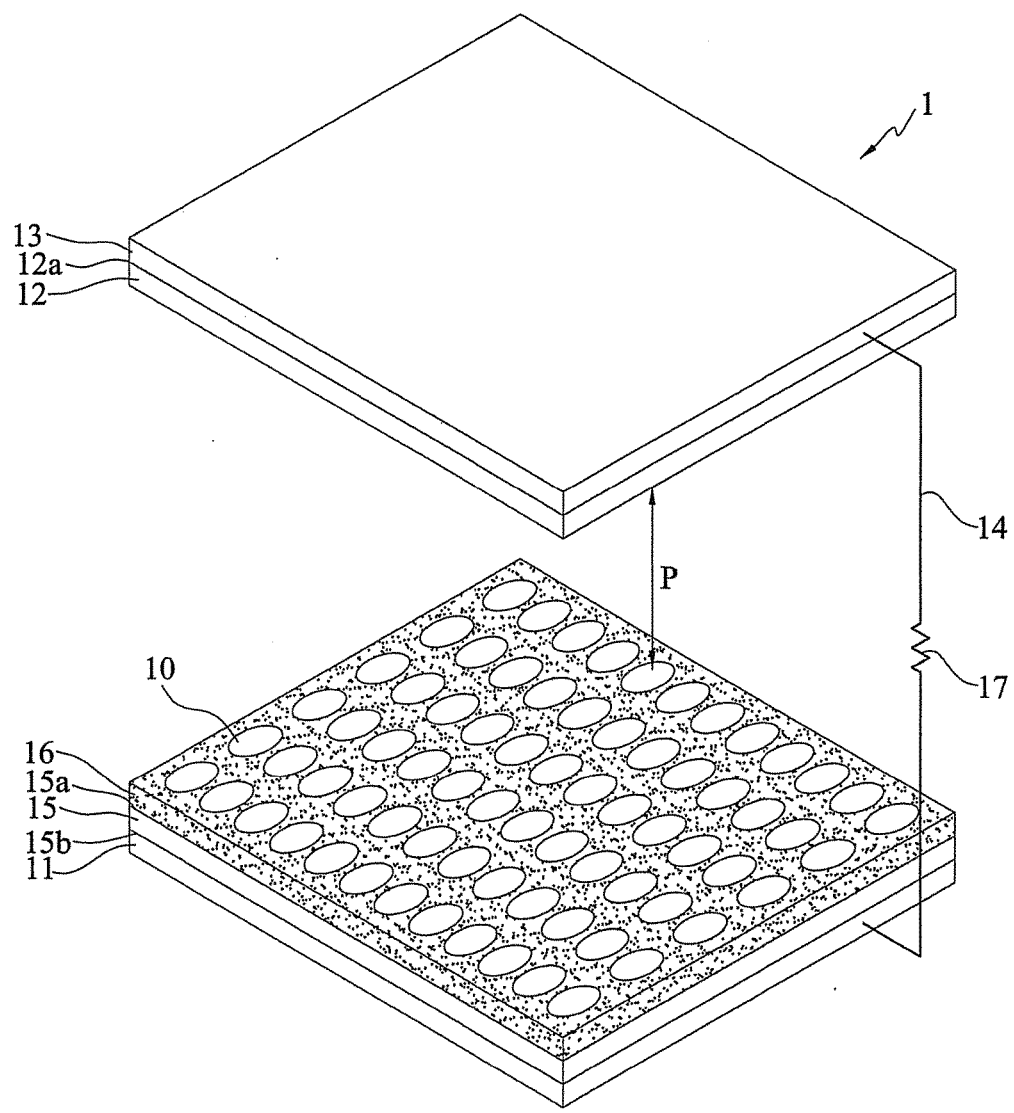
FIG. 4 is a perspective view of a second embodiment of a power generating apparatus according to the present invention.
Figure 6:
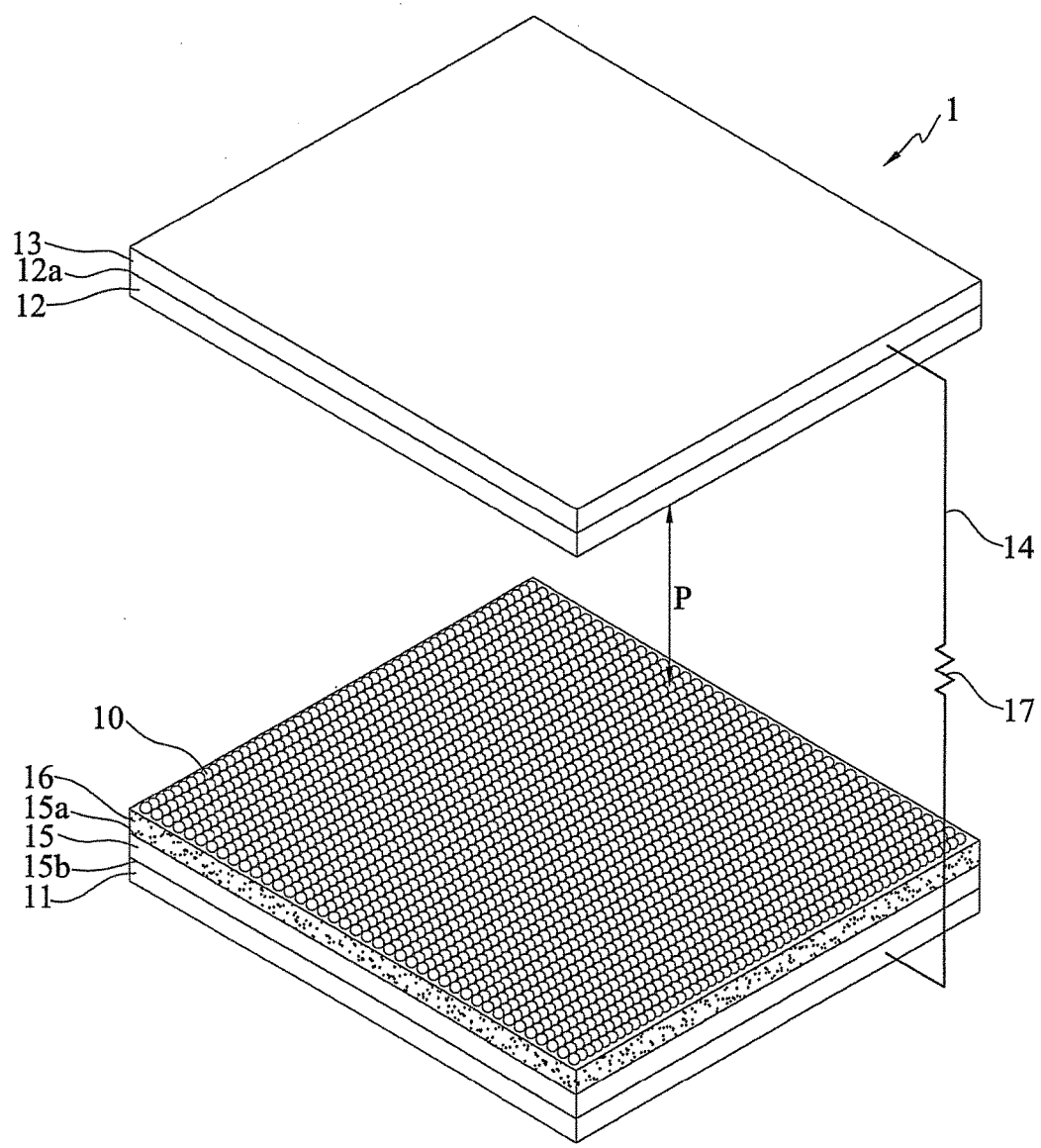
FIG. 6 is a perspective view of a third embodiment of a power generating apparatus according to the present invention.

In the embodiment shown in FIG. 2, the grain material layer 10 is composed of a single husk (e.g., rice husk) of the grain material. In another embodiment, as shown in FIG. 4, the grain material layer 10 may be composed of a plurality of husks of the grain material. In yet another embodiment, as shown in FIG. 6, the grain material layer 10 may be composed of the silicon dioxide powder (e.g., porous silicon dioxide powder) of the grain material.

In the embodiments shown in FIG. 2 and FIG. 4, the grain material (such as rice husk) has a positively charged surface and contains silicon dioxide and lignin. In the embodiment shown in FIG. 6, the silicon dioxide powder of the grain material (such as a porous silicon dioxide powder) has an even higher positively charged surface than that of the grain material, and does not contain lignin of the grain material.

The power generation apparatus 1 may further include a substrate 15. The substrate 15 has a first surface 15a and a second surface 15b opposite to the first face 15a, and the substrate 15 may be made of, for example, polyethylene terephthalate (PET) or the like. The grain material layer 10 and the first electrode 11 are formed on the first surface 15a and the second surface 15b of the substrate 15, respectively. The second electrode 13 is formed on an outer surface 12a (upper surface) of the electric material layer 12.

The power generating apparatus 1 can include an adhesive material 16 to bond or secure the grain material layer 10 to the first surface 15a of the substrate 15. The adhesive material 16 exposes the upper surface of the grain material layer 10, such that the upper surface of the grain material layer 10 can correspond to the electric material layer 12. The adhesive material 16 may be made of, for example, polydimethylsiloxane (PDMS) or the like.

As shown in FIG. 2, a plurality of elastic elements such as a spring (not shown) may be disposed between the grain material layer 10 and the electric material layer 12, and a gap P is formed between the grain material layer 10 and the electric material layer 12. The grain material layer 10 and the electric material layer 12 interact with each other via the elastic elements to produce the current or the voltage.

In terms of the operations of FIG. 2 and FIG. 1, for example, when the grain material layer 10 and the electric material layer 12 come into contact or rub against each other, the grain material layer 10 and the electric material layer 12 may generate a positive charge and a negative charge, respectively. When the grain material layer 10 and the electric material layer 12 are separated from each other, a negative charge and a positive charge can be sensed on the first electrode 11 and the second electrode 13, respectively. Thereafter, the negative charge of the first electrode 11 and the positive charge of the second electrode 13 can be output to an externally coupled load 17 (such as a resistor or a capacitor) via the conductive wire 14, thereby generating the current or the voltage (outputting electricity).

Further, with the mechanism of creating charges on the first electrode 11 and the second electrode 13 by touching or rubbing the grain material layer 10 and the electric material layer 12, the present invention may provide a tactile sensor that outputs a current as a result of the external pressure. Moreover, a computer interface is controlled by the current or voltage signal output by the first electrode 11 and the second electrode 13, which can be applied to smart phones, pulse sensors, blood pressure detectors, fetal heartbeat monitors, wearable personal mobile devices, touch pads of laptops.

In an embodiment, the grain material (such as rice husk) is mainly composed of cellulose, lignin and silicon. With different varieties and origins, compositions of the grain material (such as rice husk) may vary, but the composition of a rice husk is substantially as follows: 35.5% to 45% of crude fiber (16% to 22% of pentose polycondensation), 21% to 26% of lignin, 11.4%~22% of ash, and 10% to 21% of silicon dioxide.

Based on the chemical compositions of the grain material (such as rice husk), the present invention uses the grain material as the grain material layer 10, taking advantage of the properties of silicon dioxide and lignin, such that the present invention can effectively utilize the otherwise useless agricultural waste, has low bulk density and produces carbon emissions upon burning (causing environmental damage). The almost worthless agricultural waste also allows the costs of the power generating apparatus 1 and the tactile sensor to be lowered.

Figure 3A:
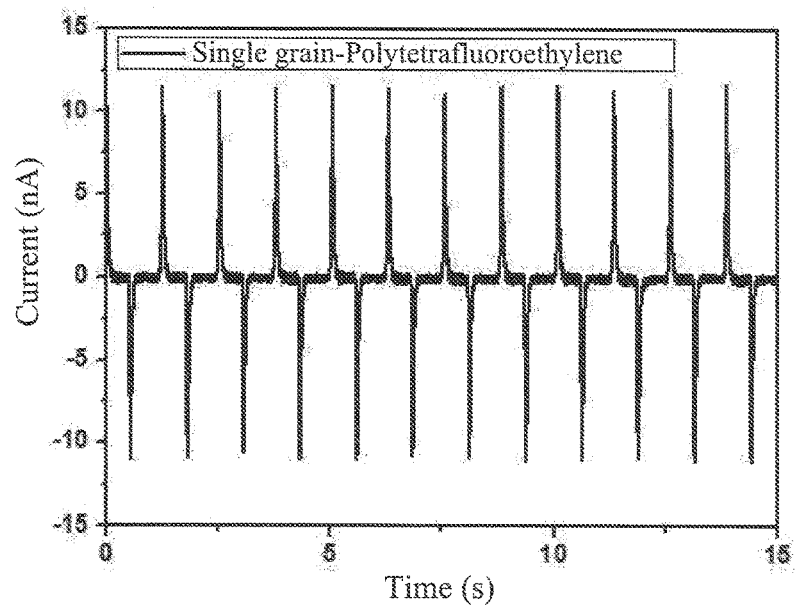
FIGS. 3A to 3D are graphs illustrating the results of testing the power generating apparatus of FIG. 2 in accordance with the present invention with a linear motor.
Figure 3B:
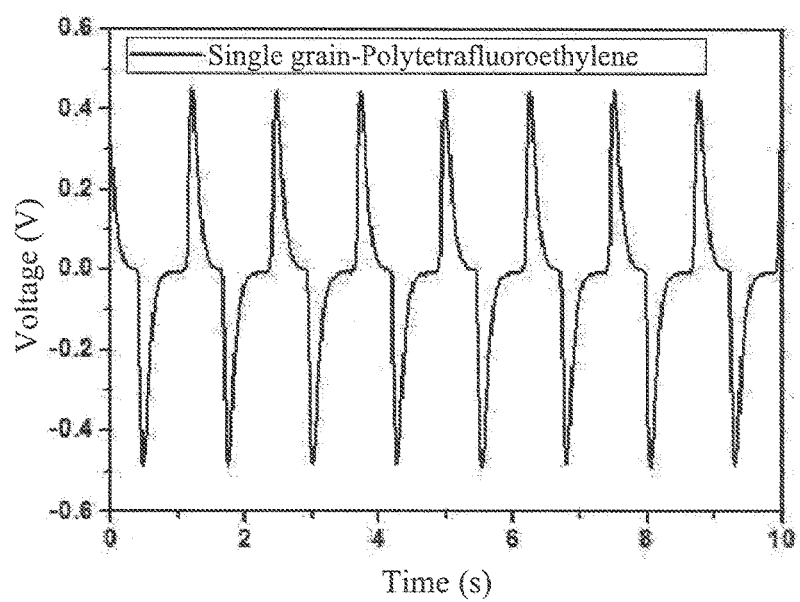

FIGS. 3A to 3D illustrate the results of testing the power generating apparatus 1 of FIG. 2 in accordance with the present invention with a linear motor (linmot). As shown in FIG. 3A, in which the grain material layer 10 is composed of a single husk (such as a rice husk) of a grain material, the output current (e.g., the short circuit current or alternating current) of the power generating apparatus 1 is about 12.5 nanoamperes (nA). As shown in FIG. 3B, the output voltage (e.g., the open circuit voltage or AC voltage) of the power generating apparatus 1 is approximately 0.45 volts (V).

Figure 3C:
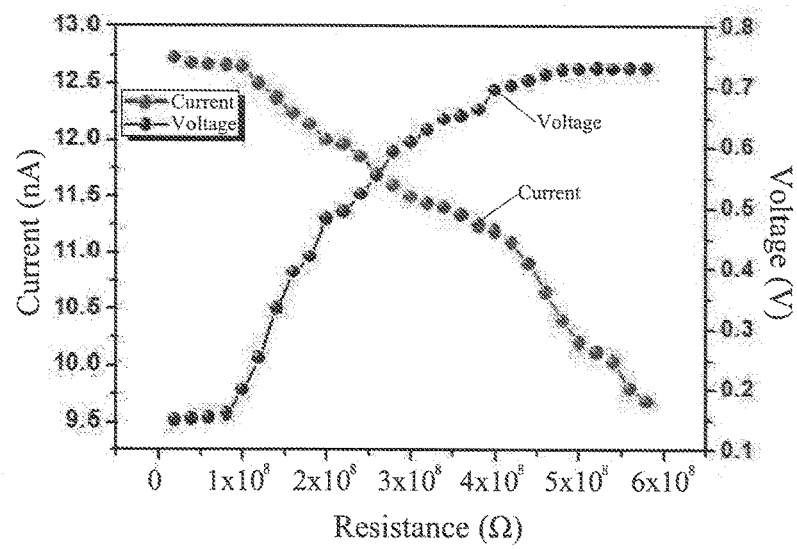
Figure 3D:
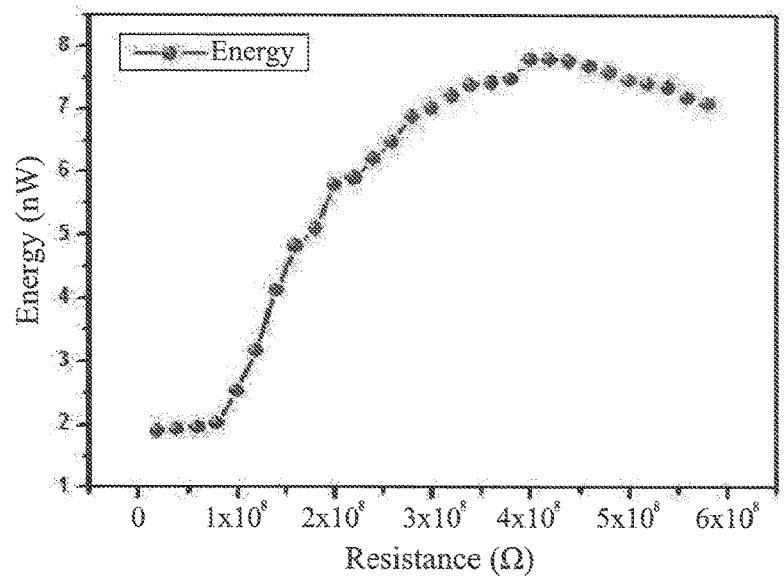

Further, as shown in FIG. 3C, the power generating apparatus 1 can be connected in series and in parallel with a resistor to measure the current and voltage at different resistances. And as seen from FIG. 3D, when the external resistance is 420 MΩ (mega ohms), the maximum energy (power) is about 7.7922 nanowatts (nW).

Referring to FIG. 4, a perspective view of a second embodiment of the power generating apparatus 1 according to the present invention is shown. The power generating apparatus 1 of FIG. 4 differs from that of FIG. 2 in that the grain material layer 10 of FIG. 4 is composed of a plurality of husks of a grain material, and these husks are arranged in an array, such as a 12×6 array.

Figure 5A:
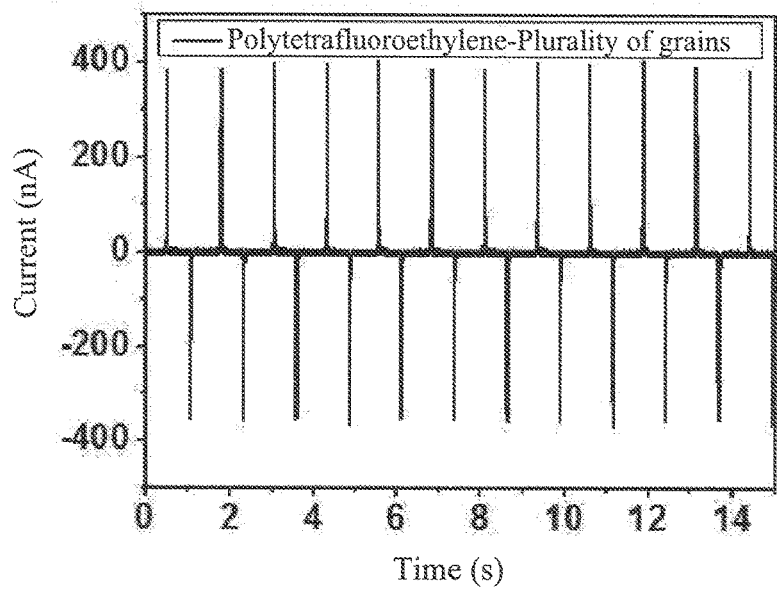
FIGS. 5A to 5D are graphs illustrating the results of testing the power generating apparatus of FIG. 4 in accordance with the present invention with a linear motor.
Figure 5B:
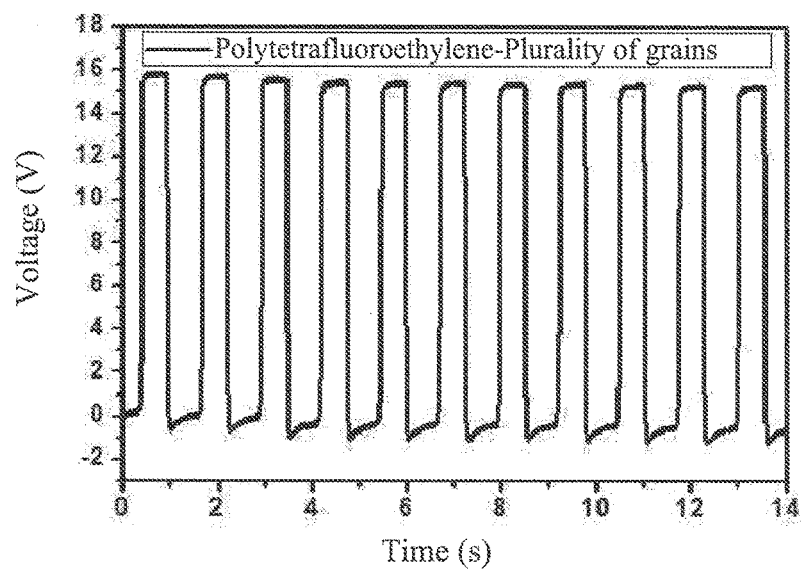

FIGS. 5A to 5D illustrate the results of testing the power generating apparatus 1 of FIG. 4 in accordance with the present invention with a linear motor (linmot). As shown in FIG. 5A, in which the grain material layer 10 is composed of a plurality of husks (such as rice husks) of a grain material, the output current (e.g., the short circuit current or alternating current) of the power generating apparatus 1 is about 400 nA. As shown in FIG. 5B, the output voltage (e.g., the open circuit voltage or AC voltage) of the power generating apparatus 1 is approximately 16 V.

Figure 5C:
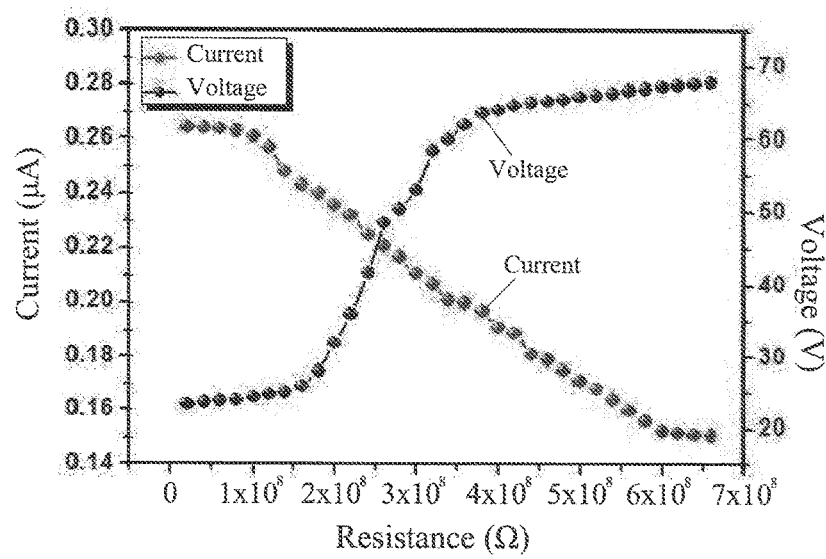
Figure 5D:
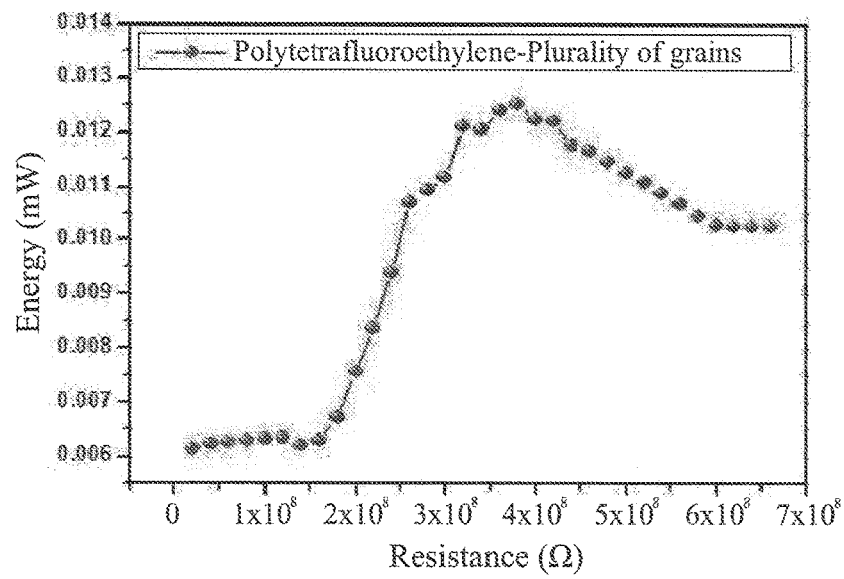

Further, as shown in FIG. 5C, the power generating apparatus 1 can be connected in series and in parallel with a resistor to measure the current and voltage at different resistances. And as seen from FIG. 5D, when the external resistance is 380 MΩ, the maximum energy (power) is about 0.01253 mW.

Referring to FIG. 6, a perspective view of a third embodiment of the power generating apparatus 1 according to the present invention is shown. The power generating apparatus 1 of FIG. 6 differs from those of FIGS. 2 and 4 in that the grain material layer 10 of FIG. 4 is composed of silicon dioxide powder (e.g., porous silicon dioxide powder) of a grain material.

Figure 7A:
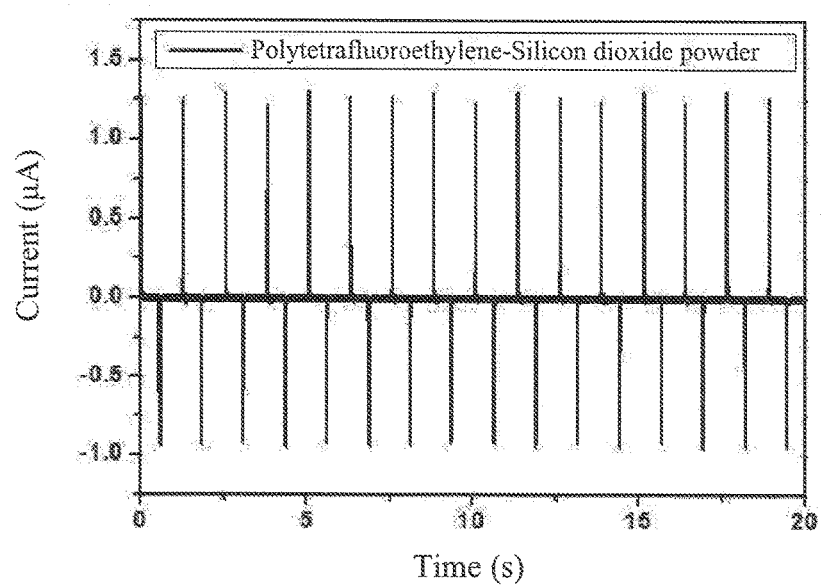
FIGS. 7A to 7D are graphs illustrating the results of testing the power generating apparatus of FIG. 6 in accordance with the present invention with a linear motor.
Figure 7B:
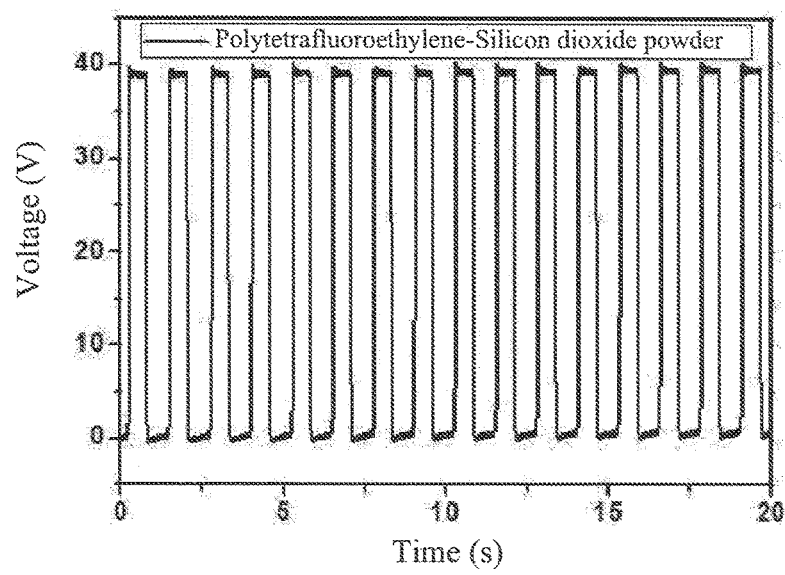

FIGS. 7A to 7D illustrate the results of testing the power generating apparatus 1 of FIG. 6 in accordance with the present invention with a linear motor (linmot). As shown in FIG. 7A, in which the grain material layer 10 is composed of silicon dioxide powder of a grain material (e.g., rice husks), the output current (e.g., the short circuit current or alternating current) of the power generating apparatus 1 is about 1.25 microamperes (µA). As shown in FIG. 7B, the output voltage (e.g., the open circuit voltage or AC voltage) of the power generating apparatus 1 is approximately 40 V.

Figure 7C:
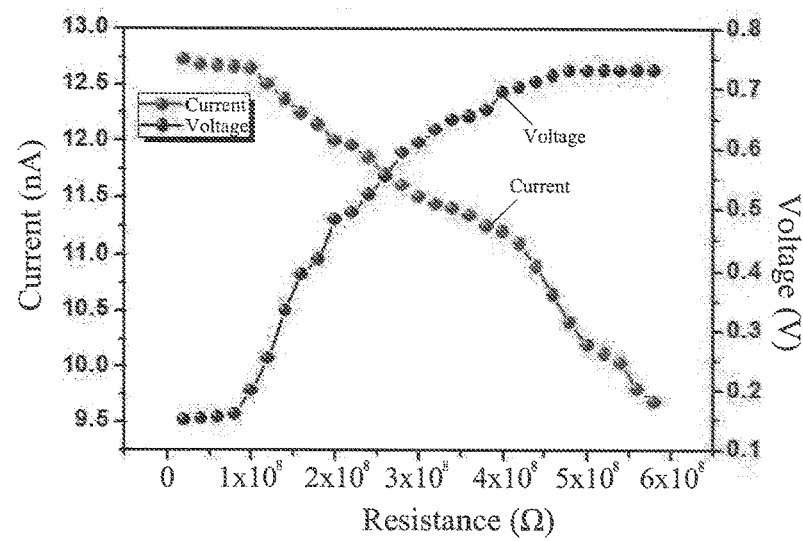
Figure 7D:
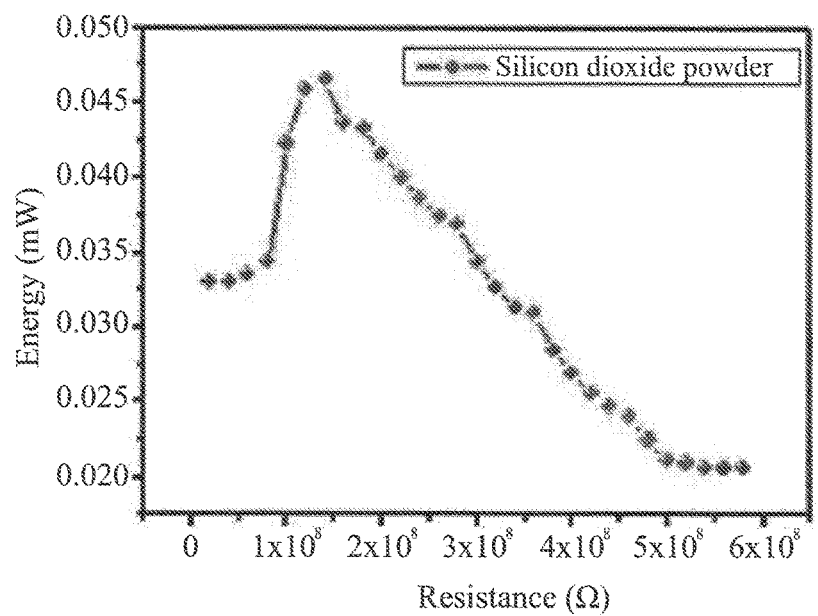

As shown in FIG. 7C, the power generating apparatus 1 can be connected in series and in parallel with a resistor to measure the current and voltage at different resistances. And as seen from FIG. 7D, when the external resistance is 140 MΩ, the maximum energy (power) is about 0.04654 mW.

Figure 8:
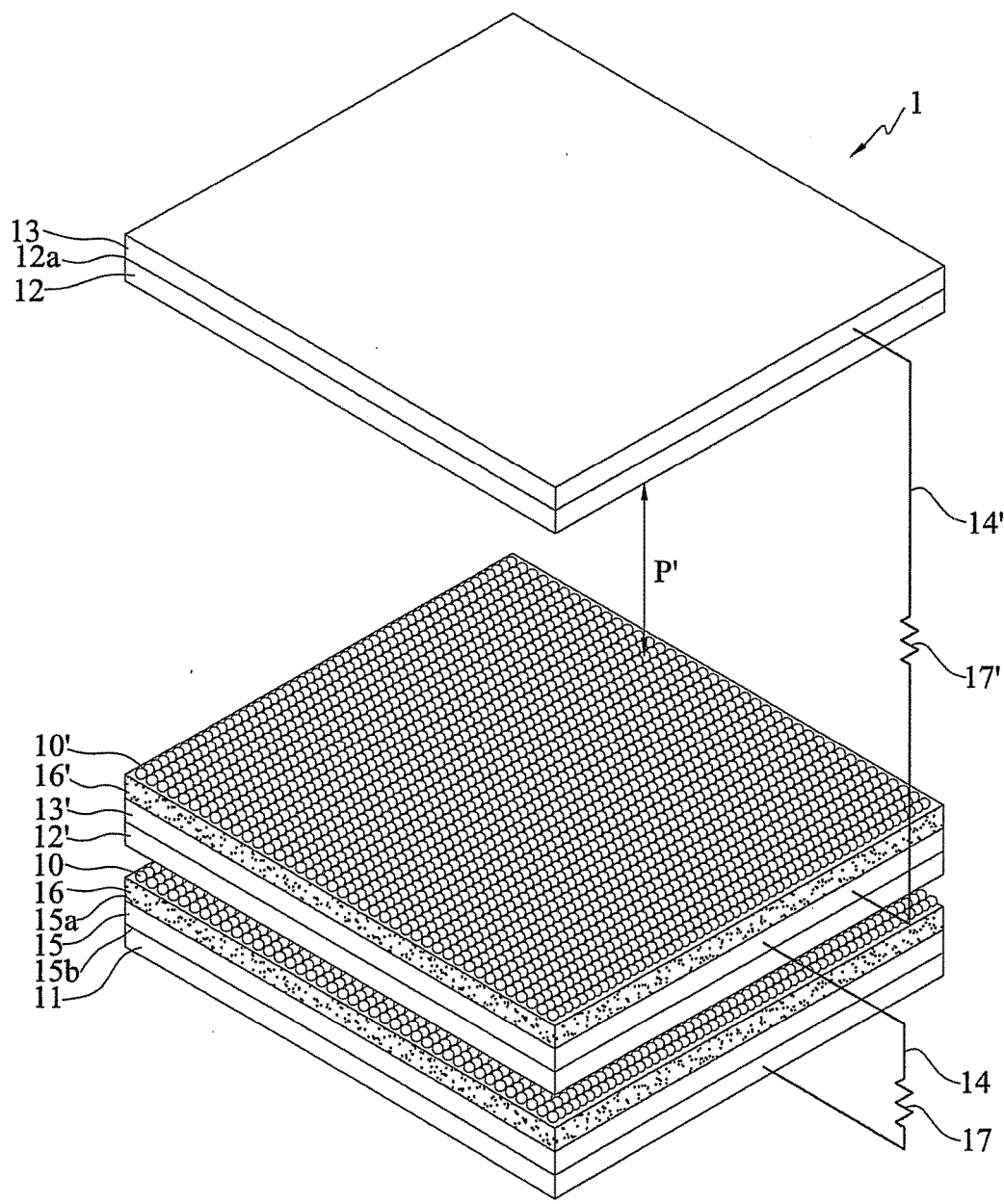
FIG. 8 is a perspective view of a fourth embodiment of a power generating apparatus according to the present invention.

FIG. 8 is a perspective view of a fourth embodiment of the power generating apparatus 1 according to the present invention. The power generating apparatus 1 of FIG. 8 is similar to those of FIGS. 2, 4 and 6, and the main differences are as follows.

In FIG. 8, the power generating apparatus 1 includes at least two grain material layers, i.e., a first grain material layer 10 and a second grain material layer 10'. The first grain material layer 10 is provided on the first surface 15a of the substrate 15, and the second grain material layer 10' is between the electric material layer 12 and the first grain material layer 10.

The power generating apparatus 1 can also comprises a third electrode 13', another electric material layer 12' and another conductive wire 14'. The third electrode 13' is formed between the second grain material layer 10' and the another electric material layer 12'. The conductive wire 14 and the another conductive wire 14' are electrically connected to the third electrode 13' through the first electrode 11 and the second electrode 13, respectively. The first grain material layer 10 and the second grain material layer 10' interact with the another electric material layer 12' and the electric material layer 12, respectively, to generate the current or the voltage. The first electrode 11 to the third electrode 13' can be made of a conductive material or a metal material such as copper (Cu).

The first grain material layer 10 can be bonded or secured to the first surface 15a of the substrate 15 by the adhesive material 16, and the adhesive material 16 exposes the upper surface of the first grain material layer 10, such that the upper surface of the first grain material layer 10 touches the lower surface of the another electric material layer 12'.

The second grain material layer 10' can be bonded or secured onto the upper surface of the third electrode 13' by an adhesive material 16'. The adhesive material 16' exposes the upper surface of the second grain material layer 10', such that the upper surface of the second grain material layer 10' corresponds in position to the lower surface of the electric material layer 12.

In an embodiment, a gap (a second gap) P' is formed between the second grain material layer 10' and the electric material layer 12, the first grain material layer 10 and the another electric material layer 12' can be unsecured to each other (e.g., in a movable state or floating state), the upper surface of the second grain material layer 10' and the lower surface of the another electric material layer 12' may interact with the lower surface of the electric material layer 12 and the upper surface of the first grain material layer 10, respectively, to generate currents or voltages. In other words, while the upper surface of the second grain material layer 10' is interacting with lower surface of the electric material layer 12, the lower surface of the another electric material layer 12' is also interacting with the upper surface of the first grain material layer 10, such that a greater current or voltage is generated by the power generating apparatus 1.

From the second electrode 13, the another conductive wire 14' can be electrically connected to a load 17' (e.g., a resistor or a capacitor), the third electrode 13', the conductive wire 14, the load 17 (e.g., a resistor or a capacitor) and the first electrode 11 in the order given. The conductive wire 14 and the another conductive wire 14' connect the first electrode 11, the second electrode 13, and the third electrode 13' in series (as shown) or in parallel. The charges from the first electrode 11, the second electrode 13, and the third electrode 13' can be outputted to the load 17 and the load 17' via the conductive wire 14 and the another conductive wire 14', thereby outputting a current, a voltage or electrical energy.

A plurality of first elastic elements, such as springs (not shown), may be disposed between the second grain material layer 10' and the electric material layer 12, and the second gap P' is thus formed between the second grain material layer 10' and the electric material layer 12. The second grain material layer 10' and the electric material layer 12 interact with each other via the first elastic elements to produce the current or the voltage.

Figure 9:
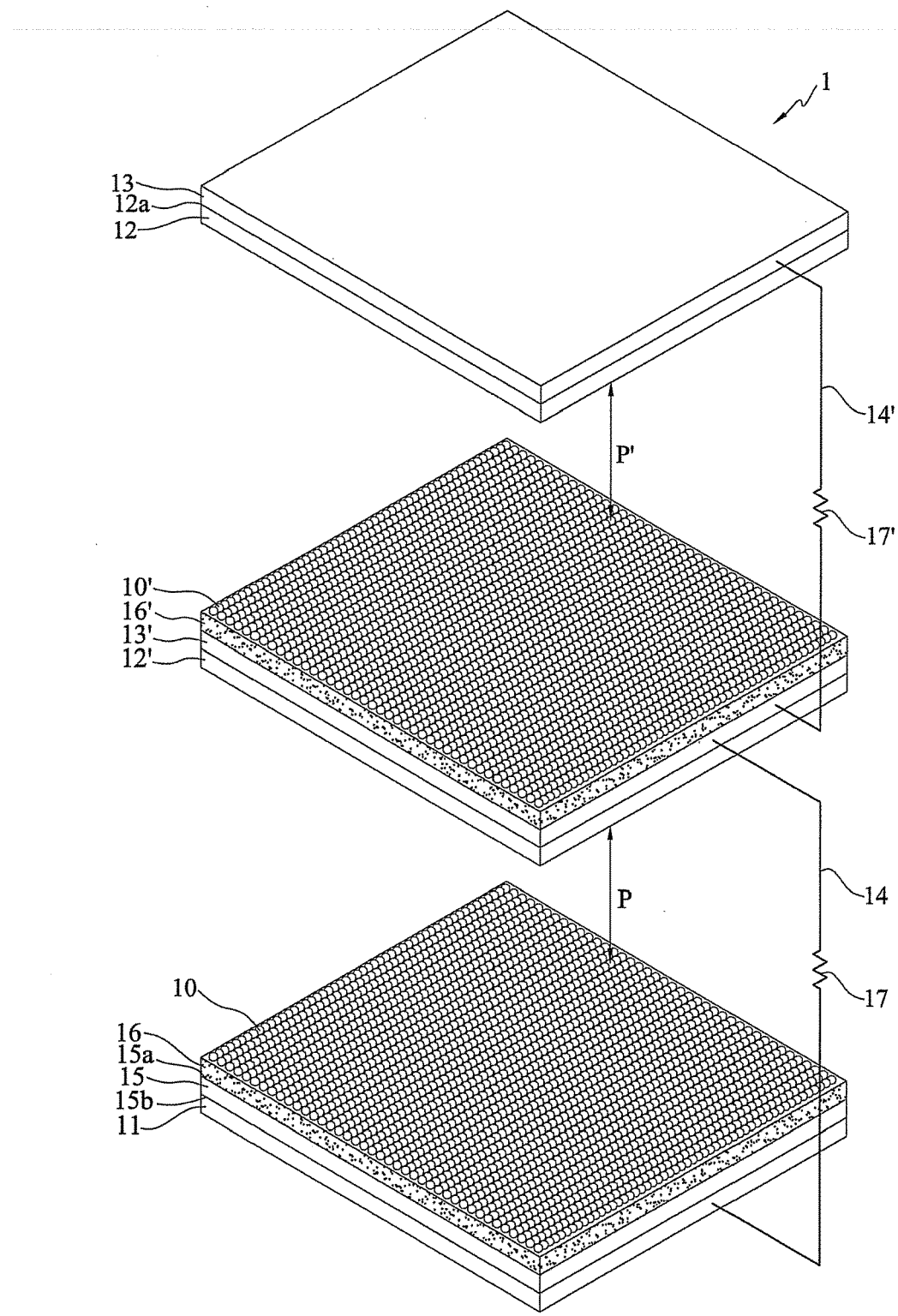
FIG. 9 is a perspective view of a fifth embodiment of a power generating apparatus according to the present invention.

FIG. 9 is a perspective view of a fifth embodiment of the power generating apparatus 1 according to the present invention. The power generating apparatus 1 of FIG. 9 is similar to the power generating apparatus 1 of FIG. 8, and the main differences are as follows.

In FIG. 9, a first gap P is formed between the first grain material layer 10 and the another electric material layer 12', and a second gap P' is formed between the second grain material layer 10' and the electric material layer 12. The upper surface of the second grain material layer 10' interacts with the lower surface of the electric material layer 12, and the lower surface of the another electric material layer 12' interacts with the upper surface of the first grain material layer 10, to enable the power generating apparatus 1 to generate greater current or voltage.

A plurality of second elastic elements (not shown) such as springs can be disposed between the first grain material layer 10 and the another electric material layer 12', the first grain material layer 10 and the another electric material layer 12' are thus separated from each other by the first gap P, and the first grain material layer 10 interacts with the another electric material layer 12' via the second elastic element, to generate the current or the voltage.

It should be noted that the present invention may use foam acid and annealing process to remove lignin of the grain material (such as rice husk) to form silicon dioxide powder (such as porous silicon dioxide powder), such that the grain material having a positively charged surface is superseded by silicon dioxide powder having an even higher positively charged surface (see FIG. 1), so that a large charge affinity gap between the material of the grain material layer 10 and the material of the electric material layer 12 is created, thereby raising the output charge.

In an embodiment, the method for forming silicon dioxide powder by processing the grain material of the present invention (such as rice husks) is for example as follows. The grain material (such as rice husks) is soaked in hydrochloric acid solution (100° C.), then drained and put into a furnace tube at a high temperature (700° C.) to remove the unwanted lignin components of the grain material, such as the lignin and cellulose, and finally it is pounded with a mortar to prepare nanoscale silicon dioxide powder (porous silicon dioxide powder). This takes advantage of the microstructure of the grain material (e.g., rice husks) itself in order to obtain a surface to volume ratio (BET Surface Area) up to 184.2987 $m^2/g$, thus greatly improving the contact area 12 between the grain material layer 10 and the electric material layer 12, and in turn increasing the output current or voltage of the power generating apparatus 1.

Figure 10A:
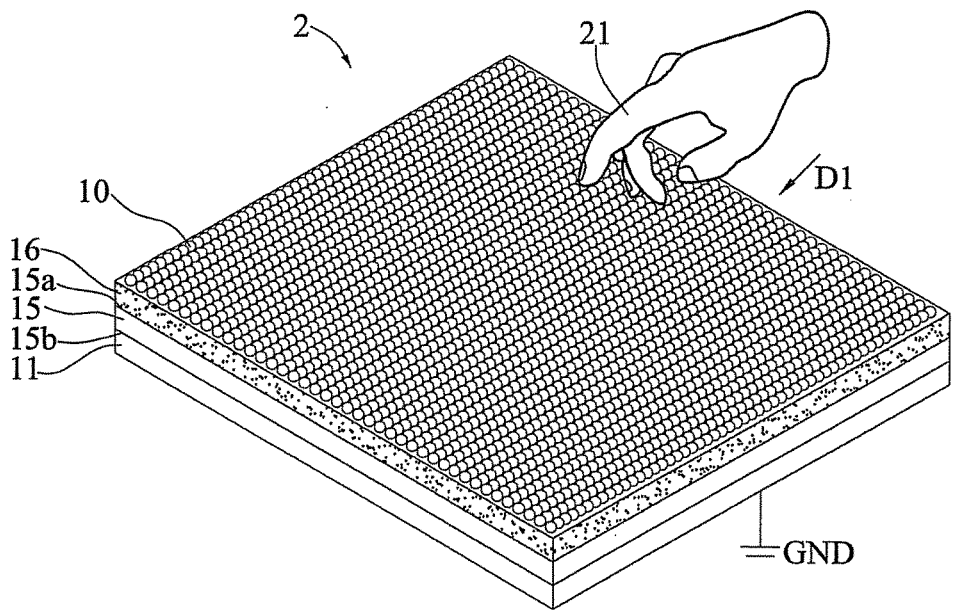
FIGS. 10A and 10B are perspective views of an embodiment of a touch apparatus in accordance with the present invention.
Figure 10B:
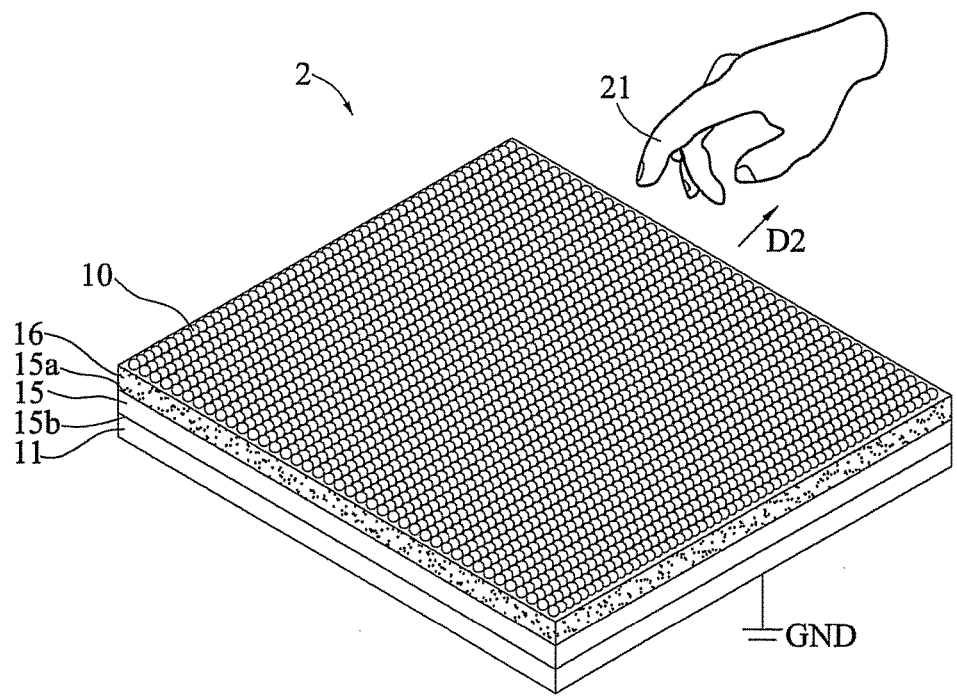

FIGS. 10A and 10B are perspective views of an embodiment of a touch apparatus 2 in accordance with the present invention. The touch apparatus 2 includes at least one grain material layer 10 and at least one first electrode 11. The touch apparatus 2 allows a touch object 21 to perform touch control.

Similar to FIG. 2, 4, 6 or 8, the grain material layer 10 of FIGS. 10A and 10B can be composed of a single husk (e.g., a rice husk) (FIG. 2) of the grain material, a plurality of husks (FIG. 4) of the grain material, or the silicon dioxide powder (e.g., porous silicon dioxide powder) of the grain material (FIG. 6). There can also be at least two grain material layers 10 and 10' (FIG. 8).

In FIGS. 10A and 10B, the first electrode 11 is electrically connected with the grain material layer 10, and the first electrode 11 may be made of, for example, copper. The touch object 21 may perform touch control on the grain material layer 10. The touch object 21 interacts with the grain material layer 10 (e.g., by induction) to produce charges via the first electrode 11, which in turn creates a current or a voltage. The touch object 21 can be a stylus, a user's finger or the like. The positively charged surface of the grain material layer 10 (one or a plurality of husks of the grain material) can be lower than that of the touch object 21 (e.g. a finger or a stylus). However, the present invention is not so limited.

The touch apparatus 2 includes a substrate 15. The substrate 15 has a first surface 15a and a second surface 15b opposite to the first surface 15a. The grain material layer 10 and the first electrode 11 are formed on the first surface 15a and the second surface 15b of the substrate 15, respectively.

The touch apparatus 2 includes a ground terminal GND that is electrically connected with the first electrode 11. The touch object 21 interacts with the grain material layer 10, and the current or voltage is produced through the first electrode 11 and the ground terminal GND.

The touch apparatus 2 includes an adhesive material 16 for bonding or securing the grain material layer 10 onto the first surface 15a of the substrate 15. The adhesive material 16 exposes the upper surface of the grain material layer 10, thereby allowing the touch object 21 to touch (or approach) the upper surface of the grain material layer 10. The adhesive material 16 may be made of polydimethylsiloxane (PDMS) or the like.

In terms of the operations of the touch apparatus 2, for example, when the touch object 21 of FIG. 10A is touching (or approaching) the upper surface of the grain material layer 10 in a direction D1, the touch object 21 and the grain material layer 10 may be positively and negatively charged, respectively, such that the touch apparatus 2 overall maintains electrically neutral.

Then, when the touch object 21 of FIG. 10B is moving away from the upper surface of the grain material layer 10 of FIG. 10A in a direction D2, the first electrode 11 creates a positive charge, and electrons flow from the first electrode 11 to the ground terminal GND, so as to maintain the electrical neutrality of the touch apparatus 2. Further, when the amount of electrons flowing into the ground terminal GND reaches maximum, the positive charge of the first electrode 11 and the negative charge of the grain material layer 10 achieve charge balance.

Thereafter, when the touch object 21 of FIG. 10A is again touching (or approaching) the grain material layer 10 according to the direction D1, electrons flow from the ground terminal GND into the first electrode 11 to cancel out the positive charge of the first electrode 11.

In an embodiment, the at least one first electrode 11 may include a plurality of electrodes, e.g., two, three, four or more electrodes, and can be arranged in series, in parallel, or in an array. The grain material layer 10 and the first electrodes 11 are formed on the first surface 15a and the second surface 15b of the substrate 15, respectively. The first electrodes 11 may be located at different positions of the second surface 15b in order to correspond to different positions of the grain material layer 10. As such, the touch object 21 may touch different positions of the grain material layer 10 to control different first electrodes 11, thus achieving multi-touch.

Figure 11A:
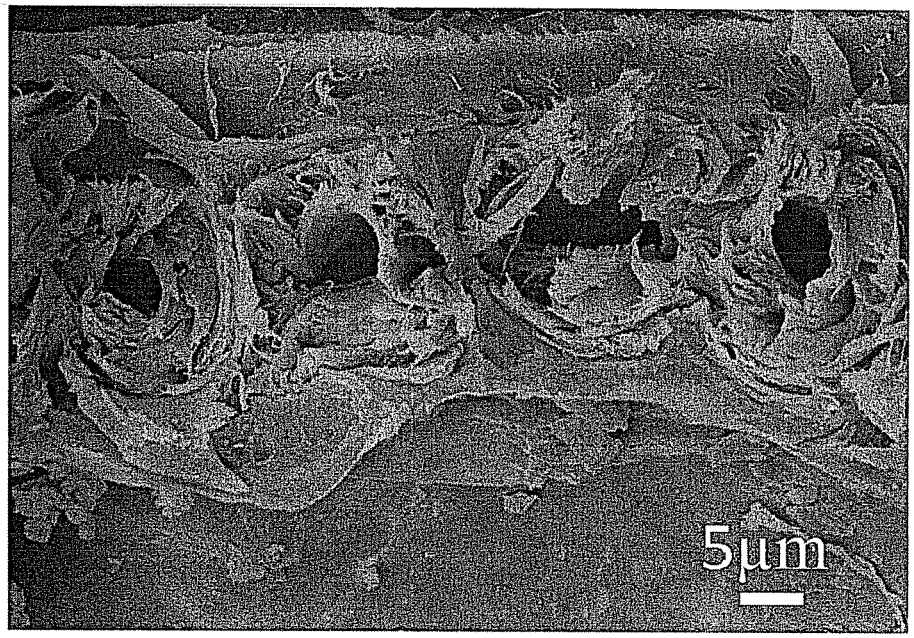
FIG. 11A is an image illustrating an unburned grain material (such as rice husk) that is not processed by acid in accordance with the present invention.
Figure 11B:
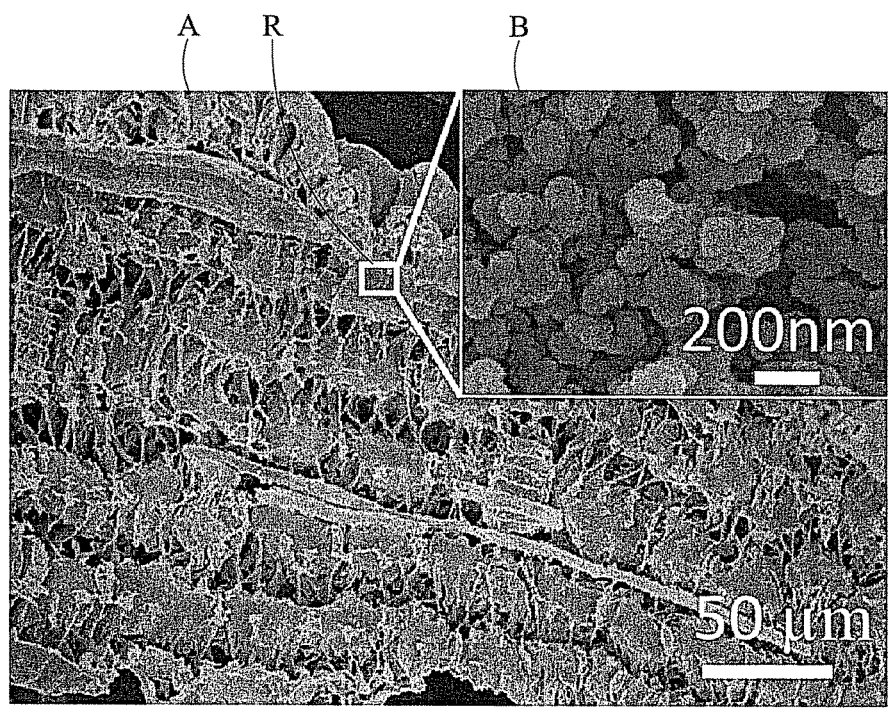
FIG. 11B is an image illustrating a burned grain material (such as rice husk) that is processed by acid and then burned in accordance with the present invention, wherein an image B is an enlarged view of an area R of an image A.

FIG. 11A is an image illustrating an unburned grain material (such as rice husk) that is not processed by acid in accordance with the present invention. FIG. 11B is an image illustrating a burned grain material (such as rice husk) that is processed by acid and then burned in accordance with the present invention, wherein an image B is an enlarged view of an area R of an image A. As shown in FIG. 11A, viewed in a μm scale, the unburned grain material that is not processed by acid has a small number of bigger apertures. By contrast, FIG. 11B shows that, viewed in μm and nm scales, the burned grain material that is processed by acid has a significant number of smaller apertures.

Figure 12:
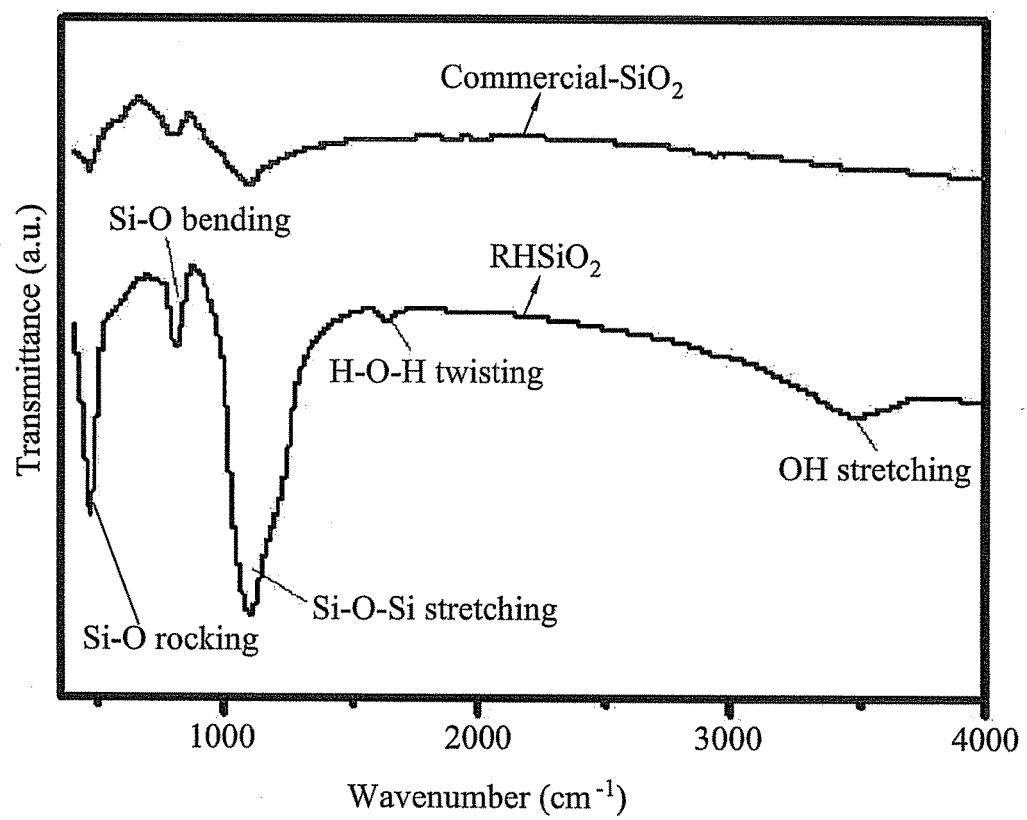
FIG. 12 is a curve graph illustrating the comparison between a burned grain material (such as rice husk, RHSiO$_2$) that is processed by acid in accordance with the present invention and commercial silicon dioxide (such as bulk SiO$_2$).

FIG. 12 is a curve graph illustrating the comparison between a burned grain material (such as rice husk, $RHSiO_2$) that is processed by acid in accordance with the present invention and commercial silicon dioxide (such as bulk $SiO_2$). The curve representing the burned grain material (such as rice husk, $RHSiO_2$) that is processed by acid is below the curve representing the commercial silicon dioxide (such as bulk $SiO_2$), which means that the grain material according to the present invention has a lower transmittance than the commercial silicon dioxide.

The burned grain material (such as rice husk, $RHSiO_2$) that is processed by acid generates a plurality of bonds, such as Si—O rocking, Si—O bending, Si—O—Si stretching, H—O—H twisting and OH stretching. It is discovered through Fourier-Transform Infrared Spectrometer analysis that the burned grain material (such as rice husk, $RHSiO_2$) that is processed by acid has higher concentration of Si—O—Si and H—O—H, as compared with the commercial silicon dioxide (Commercial-$SiO_2$), and has more repulsive electrons, such that the grain material has a more positively charged surface.

In summary, compared with the prior art, a charge, current or voltage (and in turn electrical energy) can be produced by interaction between the grain material layer and the electric material layer (or touch object) according to the present invention, so the present invention achieves flexibility and low costs that are otherwise unobtainable by the conventional piezoelectric crystals. Moreover, the present invention effectively uses the otherwise "environmentally damaging" agricultural waste as a power generating apparatus or a touch apparatus, thereby solving problems associated with this type of agriculture waste, such as waste of storage space or carbon emissions upon burning.

The above embodiments are only used to illustrate the principles of the present invention, and should not be construed as to limit the present invention in any way. The above embodiments can be modified by those with ordinary skill in the art without departing from the scope of the present invention as defined in the following appended claims.

What is claimed is:

1. A power generation apparatus with a grain material comprising:
   at least one grain material layer including the grain material having a husk, an inner membrane or an outer membrane;
   a first electrode electrically connected to the grain material layer;
   an electric material layer corresponding in position to the grain material layer and spaced from the grain material layer by a gap;
   a second electrode electrically connected to the electric material layer; and
   a conductive wire electrically connected to the first electrode and the second electrode, wherein the grain material layer and the electric material layer interact with each other to generate a current or a voltage.

2. The power generation apparatus of claim 1, wherein the grain material layer is formed by a material selected from at least one grain material, and the grain material is rice husk, peanuts, sorghum, barley, wheat, oats, rye, or buckwheat.

3. The power generation apparatus of claim 1, wherein the grain material layer has a porous structure, and the porous structure of the grain material layer interacts with the electric material layer to generate the current or the voltage.

4. The power generation apparatus of claim 1, wherein the grain material layer is composed of the husk, the inner membrane or the outer membrane of the grain material.

5. The power generation apparatus of claim 1, wherein the grain material layer is composed of at least one husk of the grain material.

6. The power generation apparatus of claim 1, wherein the grain material layer is composed of a plurality of husks of the grain material, and the husks are arranged in an array.

7. The power generation apparatus of claim 1, wherein the grain material layer is composed of porous silicon dioxide powder of the grain material.

8. The power generation apparatus of claim 7, wherein the grain material has a positively charged surface and includes silicon dioxide and lignin, and the porous silicon dioxide powder has a positively charged surface higher than the positively charged surface of the grain material and does not include the lignin of the grain material.

9. The power generation apparatus of claim 1, further comprising a substrate having a first surface and a second surface opposite to the first face, wherein the grain material layer and the first electrode are formed on the first surface and the second surface of the substrate, respectively, and the second electrode is formed on an outer surface of the electric material layer.

10. The power generation apparatus of claim 9, wherein the at least one grain material layer is a first grain material layer and a second grain material layer, the first grain material is formed on the first surface of the substrate, and the second grain material is positioned between the electric material layer and the first grain material layer.

11. The power generation apparatus of claim 10, further comprising a third electrode, another electric material layer, and another conductive wire, wherein the third electrode is formed between the second grain material and the another electric material, the conductive wire and the another conductive wire are electrically connected to the third electrode through the first electrode and the second electrode, respectively, and the first grain material layer and the second grain material layer interact with the another electric material layer and the electric material layer, respectively, to generate the current or the voltage.

12. The power generation apparatus of claim 11, wherein the first grain material layer is in contact with the another electric material layer, and the first grain material layer and the another electric material layer are maintained in a non-fixed state.

13. The power generation apparatus of claim 11, wherein the another electric material layer is separated from the first grain material layer by a first gap, and the second grain material layer is separated from the electric material layer by a second gap.

14. A touch apparatus with a grain material that allows a touch object to perform touch control, the touch apparatus comprising:
at least one grain material layer including the grain material having a husk, an inner membrane or an outer membrane; and
at least one electrode electrically connected with the grain material layer,
wherein the touch object performs touch control on the grain material layer to interact with the grain material layer to generate a current or a voltage.

15. The touch apparatus of claim 14, wherein the grain material layer is composed of a single husk or a plurality of husks of the grain material, and the grain material has a positively charged surface lower than a positively charged surface of the touch object.

16. The touch apparatus of claim 14, wherein the grain material layer is composed of porous silicon dioxide powder of the grain material.

17. The touch apparatus of claim 14, further comprising a substrate having a first surface and a second surface opposite to the first face, wherein the grain material layer and the electrode are formed on the first surface and the second surface of the substrate, respectively.

18. The touch apparatus of claim 14, further comprising a ground terminal electrically connected with the electrode, wherein the touch object and the grain material layer interact with each other to generate the current or the voltage via the electrode and the ground terminal.

* * * * *